United States Patent
Fujiie et al.

(10) Patent No.: US 6,741,526 B1
(45) Date of Patent: May 25, 2004

(54) MAGNETIC HEAD DEVICE AND RECORDING/REPRODUCING APPARATUS USING THE MAGNETIC HEAD DEVICE

(75) Inventors: Kazuhiko Fujiie, Kanagawa (JP); Naohiro Netsu, Chiba (JP); Tomohiro Koda, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/507,848

(22) Filed: Feb. 22, 2000

(30) Foreign Application Priority Data

Mar. 3, 1999 (JP) .......................... 11-056110

(51) Int. Cl.⁷ .......................... G11B 11/00; G11B 5/127
(52) U.S. Cl. .................. 369/13.17; 369/275.2; 360/125; 360/246.2; 360/246.9; 360/234.7; 360/234.8; 360/240
(58) Field of Search .......................... 360/59, 110, 125, 360/234, 234.7, 234.8, 240, 246.2, 264, 264.8, 264.9, 264.7, 17; 369/13.13, 13, 13.51, 13.52, 13.17, 275.2; 385/33

(56) References Cited

U.S. PATENT DOCUMENTS

| | | | | |
|---|---|---|---|---|
| 3,678,211 A | * | 7/1972 | Hoogendorn et al. | 29/603.06 |
| 5,020,041 A | * | 5/1991 | Nakao et al. | 369/13.17 |
| 5,140,569 A | * | 8/1992 | Nebashi | 369/13.17 |
| 5,199,090 A | * | 3/1993 | Bell | 385/33 |
| 5,659,246 A | * | 8/1997 | Togo et al. | 264/272.15 |
| 5,841,612 A | * | 11/1998 | Nanjyo | 360/234.7 |

* cited by examiner

Primary Examiner—David Hudspeth
Assistant Examiner—Natalia Figueroa
(74) Attorney, Agent, or Firm—Oblon, Spivak, McClelland, Maier & Neustadt, P.C.

(57) ABSTRACT

A magnetic head device comprising a head section 55 for applying a magnetic field to a disk. The head section 55 includes a magnetic field generating section 61 and a slider 62. The slider 62 supports the magnetic field generating section 61 and may be set in sliding contact with the disk. The magnetic field generating section 61 has a magnetic core 63 and a coil 64 wound around the magnetic core 63. The section 61 is designed to generate the magnetic field and embedded in and formed integral with the slider 62. The head section 55 excels in heat-radiating property.

9 Claims, 6 Drawing Sheets

MAGNETIC HEAD DEVICE AND RECORDING/REPRODUCING APPARATUS USING THE MAGNETIC HEAD DEVICE

BACKGROUND OF THE INVENTION

The present invention relates to a magnetic head device set in sliding contact with a surface of a disk such as a magnetic disk or a magneto-optical disk that is used as a recording medium. The present invention also relates to a recording/reproducing apparatus, which uses this magnetic head device.

Hitherto known is a recording/reproducing apparatus which uses, as a recording medium, a magneto-optical disk that comprises a substrate transparent to light and a magneto-optical recording layer formed on the substrate and composed of a perpendicular magnetizing film. The recording/reproducing apparatus comprises a disk drive mechanism, a magnetic head device, and an optical pickup device. The disk drive mechanism rotates the magneto-optical disk. The magnetic head device is arranged at one side of the magneto-optical disk to apply an external magnetic field to the magneto-optical recording layer of the disk. The optical pickup device applies a light beam to the magneto-optical recording layer provided on that side of the magneto-optical disk. In the recording/reproducing apparatus, the magnetic head device applies a magnetic field to the magneto-optical recording layer of the magneto-optical disk being rotated. The magnetic field thus applied has a direction modulated in accordance with the data signal to be recorded on the magneto-optical disk. In addition, the light beam emitted from the optical pickup device is converged and applied to the magneto-optical recording layer. Applied with the light beam, the magneto-optical recording layer is heated to Curie point. Those parts of the layer which have lost coersive force, are magnetized in the direction of the magnetic field applied from the magnetic head device. Thereafter, the temperature of the magneto-optical recording layer falls below Curie point as the light beam moves relative to the magneto-optical disk that keeps rotating. The direction of the magnetic field is fixed in the layer, whereby the data signal is recorded on the magneto-optical disk.

The magnetic head device for applying a magnetic field to the magneto-optical recording layer of the magneto-optical disk has a head section 101 as shown in FIG. 1. The head section 101 comprises a magnetic field generating section 105 and a slider 106. The slider 106 holds the magnetic field generating section 105. The section 105 is composed of a magnetic core 102, a coil 103, and a bobbin 104. The coil 103 is wound around the bobbin 104.

The magnetic core 102, which is one component of the magnetic field generating section 105, comprises a center pole core 102a and a pair of side pole cores 102b, and a coupling section 102c. The side pole cores 102b are arranged on one side of the center pole core 102a and the other side thereof, respectively. The coupling section 102c connects the center pole core 102a and the side pole cores 102b at their proximal ends. The magnetic core 102 is shaped like letter E, as a whole. The bobbin 104 has an upper flange section 104a and a lower flange section 104b. Both flange sections 104a and 104b have a through hole, through which the center pole core 102a of the magnetic core 102 extends. The center pole core 102a of the magnetic core 102 passes through the holes of the flange sections and the coil 103 is wound around the center pole core 102a and made integral therewith. The magnetic field generating section 105 is thereby formed.

The slider 106, which holds the magnetic field generating section 105, is made of synthetic resin by means of injection molding. The slider 106 has a holder section 107 at its proximal end, for holding the magnetic field generating section 105. The slider 106 has a sliding-contact section 108 extending from the distal end of the holder section 107. The sliding-contact section 108 may be set into sliding contact with a magneto-optical disk. The holder section 107 has a recess, in which the magnetic field generating section 105 is fitted. Thus, the section 105 is connected to the holder section 107.

In the head section 101 of the magnetic head device, a gap of about 0.1 mm is formed between the magnetic field generating section 105 and the holder section 107. This is inevitable because the section 105 is fitted in the holder section 107 of the slider 106. As a consequence, very little heat generated by the magnetic core 102 is radiated through the slider 106.

In the head section 101, the drive current and the record/transfer speed may be increased so that the magnetic field generating section 105 generates a more intense magnetic field. If so, the copper loss or iron loss of the coil 103 will increase, resulting in a further increase in the heat generated by the magnetic core 102 or the coil 103. When the temperature of the magnetic core 102 or coil 103 rises to a value near Curie point, the magnetic permeability inevitably decreases, reducing the intensity of the magnetic field generated. Moreover, inter-layer short-circuiting occurs in the coil 103 when the temperature of the magnetic core 102 or coil 103 rises further, possibly resulting in burning. It is therefore impossible in the head section 101 to intensity the magnetic field or raise the record/transfer speed.

Furthermore, the head section 101 cannot increase the minimum intensity guaranteed for the magnetic field. This is inevitable because the tolerances of the components are limited since the magnetic field generating section 105 must be fitted in the slider 106.

BRIEF SUMMARY OF THE INVENTION

Accordingly it is the object of the present invention to provide a magnetic head device in which heat can be efficiently radiated from the head section and the minimum intensity guaranteed for the magnetic field can be increased, and also a recording/reproducing apparatus which uses this magnetic head device.

A magnetic head device according to the present invention comprises a head section for applying a magnetic field to a disk. The head section includes a magnetic field generating section and a slider supporting the magnetic field generating section and is designed to be set in sliding contact with the disk. The magnetic field generating section has a magnetic core and a coil wound around the magnetic core. The magnetic field generating section generates the magnetic field and is embedded in and formed integral with the slider.

The head section has been formed by placing the magnetic field generating section at a prescribed position in a metal mold and then filling the metal mold with the material of the slider. The metal mold has a positioning projection. The projection is to abut on a distal end of the magnetic core, which opposes the disk, thereby to position the magnetic field generating section in a direction substantially perpendicular to the disk. A coil is wound around a bobbin that is mounted on the magnetic core. The bobbin has positioning projections to abut on sides of a metal mold for forming the head section, thereby to position the magnetic field generating section in a direction substantially parallel to the disk. Thus, the magnetic field generating section is arranged at the prescribed position in the metal mold.

A recording/reproducing apparatus according to the present invention comprises a magnetic head device. The magnetic disk device comprises a disk driving mechanism and a magnetic head mechanism. The disk driving mechanism rotates a disk. The magnetic head mechanism is provided on one side of the disk and comprises a head section for applying a magnetic field to a disk. The head section includes a magnetic field generating section and a slider supporting the magnetic field generating section and is designed to be set in sliding contact with the disk. The magnetic field generating section has a magnetic core and a coil wound around the magnetic core, for generating the magnetic field. The magnetic field generating section is embedded in and formed integral with the slider. The recording/reproducing apparatus may further comprise an optical pickup device provided on the other side of the disk and opposing the head section, for applying a light beam to the other side of the disk.

According to the present invention, the magnetic field generating section and the slider are formed integral with each other. The heat generated by the magnetic field generating section can therefore be radiated with high efficiency. The magnetic field generated by the magnetic field generating section can increase in intensity, without damaging the magnetic field generating section, and the record/transfer speed can be enhanced. Moreover, since the magnetic field generating section and the slider are formed integral in the head section, the tolerances of the components need not be taken into consideration, and the minimum intensity guaranteed for the magnetic field can yet be increased.

DETAILED DESCRIPTION OF THE INVENTION

A magnetic head device using a recording medium cartridge and a recording/reproducing apparatus using the magnetic head device, both according to the present invention, will be described with reference to the accompanying drawings.

Figure 1:
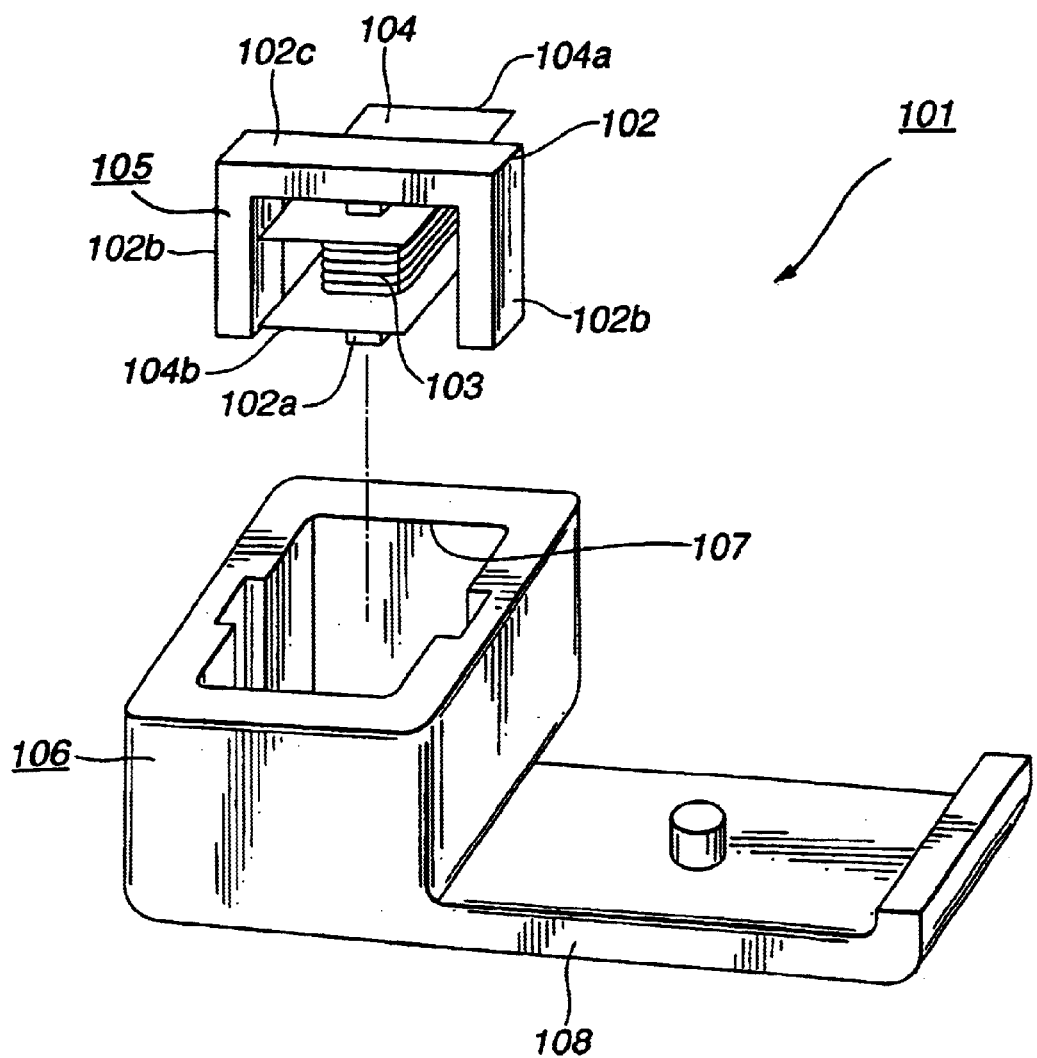
FIG. 1 is an exploded perspective view of the head section incorporated in a conventional magnetic head device.
Figure 2:
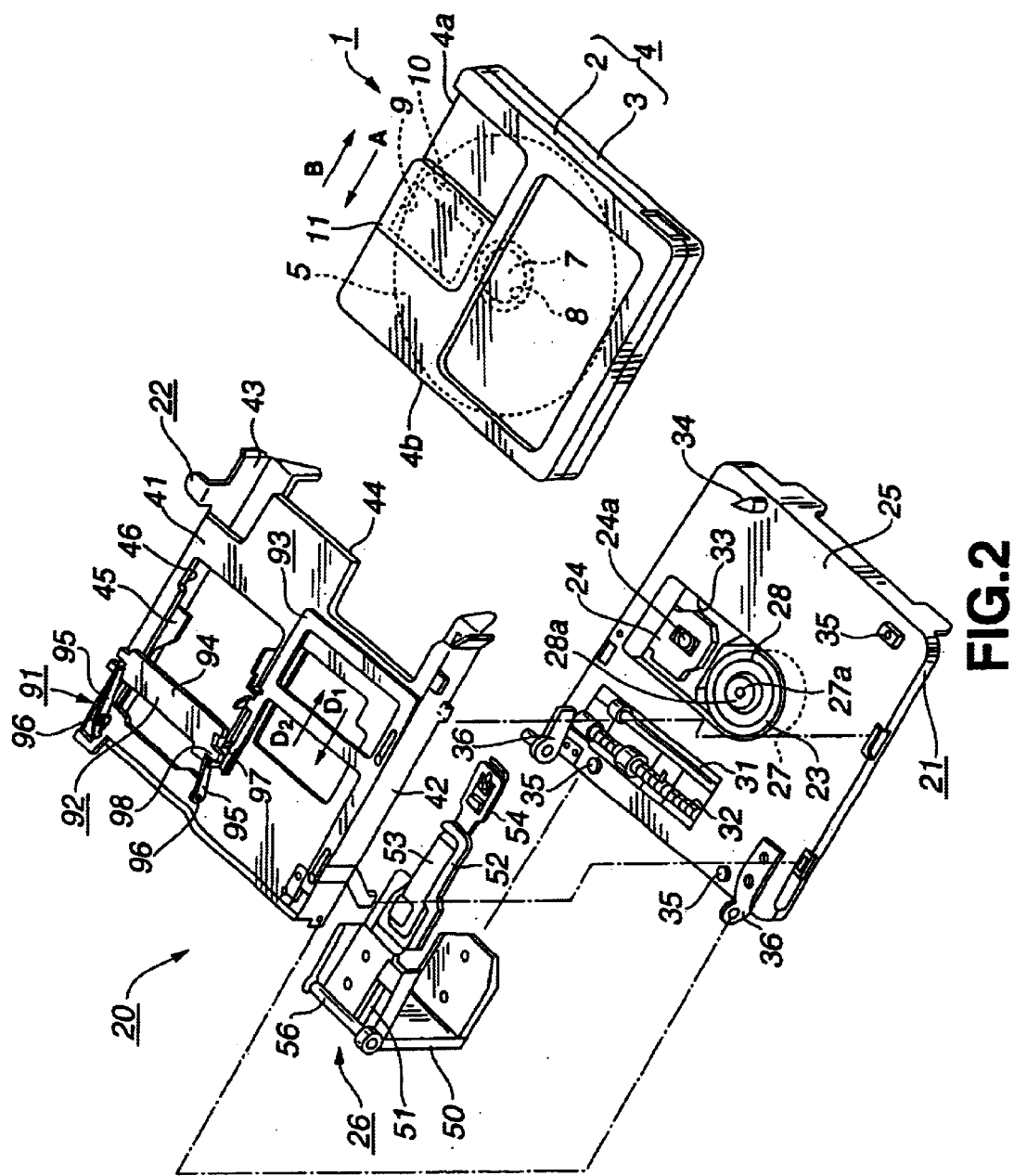
FIG. 2 is an exploded perspective view of an apparatus according to this invention, which is designed to record data on and reproduce data from a magneto-optical disk.

As shown in FIG. 2, the recording/reproducing apparatus 20 holds a disk cartridge 1 containing a magneto-optical disk that is used as a recording medium. The apparatus 20 is designed to record data signals such as music signals, video signals and the like on the magneto-optical disk and to reproduce the data signals from the magneto-optical disk. The apparatus 20 has a magnetic head device for applying an external magnetic field to the magneto-optical disk to record data signals on the magneto-optical disk. The recording/reproducing apparatus 20 is made small to a portable size.

The recording/reproducing apparatus 20 has a housing (not shown), or a main body. As shown in FIG. 2, the apparatus 20 comprises a base 21 and a cartridge holder 22, both provided in the housing. The base 21 is a flat, almost rectangular plate made of metal. The cartridge holder 22 holds the disk cartridge 1 and can rotate with respect to the base 21. The recording/reproducing apparatus 20 further comprises a disk drive mechanism 23, an optical pickup device 24, a cartridge holding section 25, and a magnetic head device 26. The disk drive mechanism 23 and the optical pickup device 24 are incorporated in the base plate 21. The cartridge holding section 25 is mounted on the base plate 21, to hold the disk cartridge 1 when the disk cartridge 1 is set into the cartridge holder 22. The magnetic head device 26 is moved in a radial direction of the magneto-optical disk, in synchronization with the optical pickup device 24.

The disk cartridge I used in the recording/reproducing apparatus 20 has a main body 4. As shown in FIG. 2, the main body 4 comprises an upper half 2 and a lower half 3, which abut on each other and coupled together. The main body 4 contains the magneto-optical disk 5, allowing the same to rotate. The magneto-optical disk 5 has a hole in its center. A clamping plate 7 made of magnetic material such as metal is fitted in the hole of the disk 5, thus closing the hole. The main body 4 of the cartridge I has a center opening 8, a first recording reproducing window 9, and a second recording/reproducing window 10. Through the center opening 8, the disk table 28 of the disk drive mechanism 23 provided in the recording/reproducing apparatus 20 may project into the disk cartridge 1. Through the first recording/reproducing window 9, the magnetic head device 26 may protrude into the disk cartridge 1. Through the second recording/reproducing window 10, the optical pickup device 24 opposes the magneto-optical disk 5 contained in the cartridge 1. The first recording/reproducing window 9 is cut in the upper half of the main body 4, and the second recording/reproducing window 10 is cut in the lower half of the main body 4. These windows 9 and 10 oppose each other and are almost rectangular. Each window extends from a position close to the center opening 8 to one side 4a of the main body 4, along the line passing the center opening 8 and perpendicular to the side 4a.

The main body 4 of the disk cartridge 1 has a shutter 11 that can be moved to open and close the first and second recording/ reproducing window 9 and 10. The shutter 11 has a U-shaped cross section, extends from the side 4a of the main body 4 toward the center opening 8, and usually covers or closes the windows 9 and 10. The shutter 11 has a guide strip, which is loosely fitted in the guide groove made in the side 4a of the main body 4. Thus, the shutter 11 can be moved along the side 4a of the main body 4. If the shutter 11 is moved in the direction of arrow B, it will open the windows 9 and 10. If the shutter 11 is moved in the direction of arrow A, it will close the windows 9 and 10.

The disk cartridge 1 is inserted into the recording/reproducing apparatus 20 in the direction of arrow A, first at the front 4b (i.e., one of two sides perpendicular to the side 4a). The shutter 11 is thereby moved in the opposite direction, i.e., the direction of arrow B, thus opening the windows 9 and 10. When the disk cartridge 1 is completely inserted into the apparatus 20, the disk cartridge I is set into the cartridge holder 22 provided in the recording/reproducing apparatus 20.

Once the disk cartridge 1 is set in the cartridge holder 22, it is held by the cartridge holding section 25. Thereafter, the magneto-optical disk 5 contained in the disk cartridge 1 can be rotated by the disk drive mechanism 23. As shown in FIG. 2, the disk drive mechanism 23 comprises a spindle motor 27 and a disk table 28 to be driven by the spindle motor 27. The spindle motor 27 is secured to the lower surface of the base 21. The spindle shaft 27a of the motor 27 protrudes upwards from the upper surface of the base 21, on which the cartridge holding section 25 is mounted. The disk table 28 is connected to the distal end of the spindle shaft 27a and can rotate as the spindle shaft 27a does so. A centering section 28a projects from the center part of the disk table 28. The centering section 28a is fitted into the center hole of the magneto-optical disk 5, thereby centering the disk 5, when disk cartridge 1 is set in the cartridge holder 22 and held by the cartridge holding section 25. On the disk table 28, magnets are provided to magnetically attract the clamping plate 7 so that the magneto-optical disk 5 may be rotated when the disk table 28 is rotated by the spindle motor 27.

The optical pickup device 24 is arranged on the base 21. The optical pickup device 24 is designed to apply a light beam to the magneto-optical disk 5 while the disk drive mechanism 23 is rotating the disk 5. The optical pickup device 24 comprises a semiconductor laser (not shown), an objective lens 24a, and a photoelectric detector (not shown). The semiconductor laser emits a light beam. The objective lens 24a converges the light beam and then applies the same to the magneto-optical disk 5. The photoelectric detector detects the light reflected from the magneto-optical disk 5 and converts the light to data signals and control signals. The light beam emitted from the semiconductor laser and converged by the objective lens 24a is applied to selected regions of the magneto-optical recording layer of the disk 5, heating these regions to Curie point and depriving them of coersive force. The light beam is reflected from the magneto-optical disk 5. The light, thus reflected, is detected by the photoelectric detector.

The optical pickup device 24 has both end supported mounted on a pair of parallel guide rail 31 that are provided below the base 21. The optical pickup device 24 can move in the radial direction of the magneto-optical disk 5. The base 21 has an opening 33, through which the objective lens 24a opposes the magneto-optical disk 5 located above the base 21. A screw shaft 32 extends below the base 21 and parallel to the guide rails 31 and is connected at one end to a feed motor (not shown) that is fastened to the lower surface of the base 21. When the feed motor rotates the screw shaft 32, the optical pickup device 24 is moved in the radial direction of the disk 5 mounted on the disk table 28, while being guided by the guide rails 31. In other words, the optical pickup device 24 is moved from the innermost track on the disk 5 toward the outermost track thereon, in order to record data signals on or reproduce data signals from the magneto-optical disk 5.

As mentioned above, the cartridge holding section 25 is mounted on the upper surface of the base 21 and holds the disk cartridge 1 containing the magneto-optical disk 5 which is clamped to the disk table 28 and which is rotated by the disk drive mechanism 23. The cartridge holding section 25 has a positioning pin 34 and height-setting projections 35. The pin 34 positions the disk cartridge 1 on the cartridge holding section 25. The projections 35 set the disk cartridge 1 at a desired height. The disk cartridge 1 is thereby held on the cartridge holding section 25, positioned as desired in both horizontal direction and vertical direction.

The cartridge holder 22 is provided above the base 2 land can be rotated. To hold the disk cartridge 1, the cartridge holder 22 has a top plate 41 and a pair of cartridge holding sections 42 and 43. The cartridge holding sections 42 and 43 have been made by bending downwards two opposing edge portion of a horizontal. Thus, the cartridge holder 22 has an inverted U-shaped cross section. The cartridge holding sections 42 and 43 hold the front and back of the disk cartridge 1, respectively, when the disk cartridge 1 is inserted into the recording/reproducing apparatus 20 through a cartridge slot 44 made in one side of the apparatus 20.

A shutter-opening strip 45 protrudes toward the center of the cartridge holder 22 from the middle part of the cartridge holding section 43. The strip 45 is designed to open the shutter 11 of the disk cartridge 1. The strip 45 slips into the guide groove made in the side 4a of the cartridge 1 and abuts on the shutter 11 when the disk cartridge 1 is inserted into the cartridge holder 22. When the disk cartridge 1 is completely set in the cartridge holder 22, the strip 45 pushes the shutter 11 in the direction of arrow B (FIG. 2), thereby opening both recording/reproducing window 9 and 10. The top plate 41 of the cartridge holder 22 has an opening 46, through which a part of the magnetic head device 26 can enter the cartridge holder 22.

The cartridge holder 22, thus constructed, is rotatably supported by a pair of support strips 36 secured on the rear part of the base 21. While the holder 22 remains rotated upward from the cartridge holding section 25, the disk cartridge 1 can be inserted into and removed from the cartridge holder 22. When the holder 22 holding the disk cartridge 1 is rotated downward to the cartridge holding section 25, it places the disk cartridge 1 in the cartridge holding section 25. In the section 25, the positioning pin 34 and height-setting projections 35 set the disk cartridge 1 at a desired position. While the cartridge 1 remains at this position, data can be recorded on and reproduced from the magneto-optical disk 5 contained in the cartridge 1.

Figure 3:
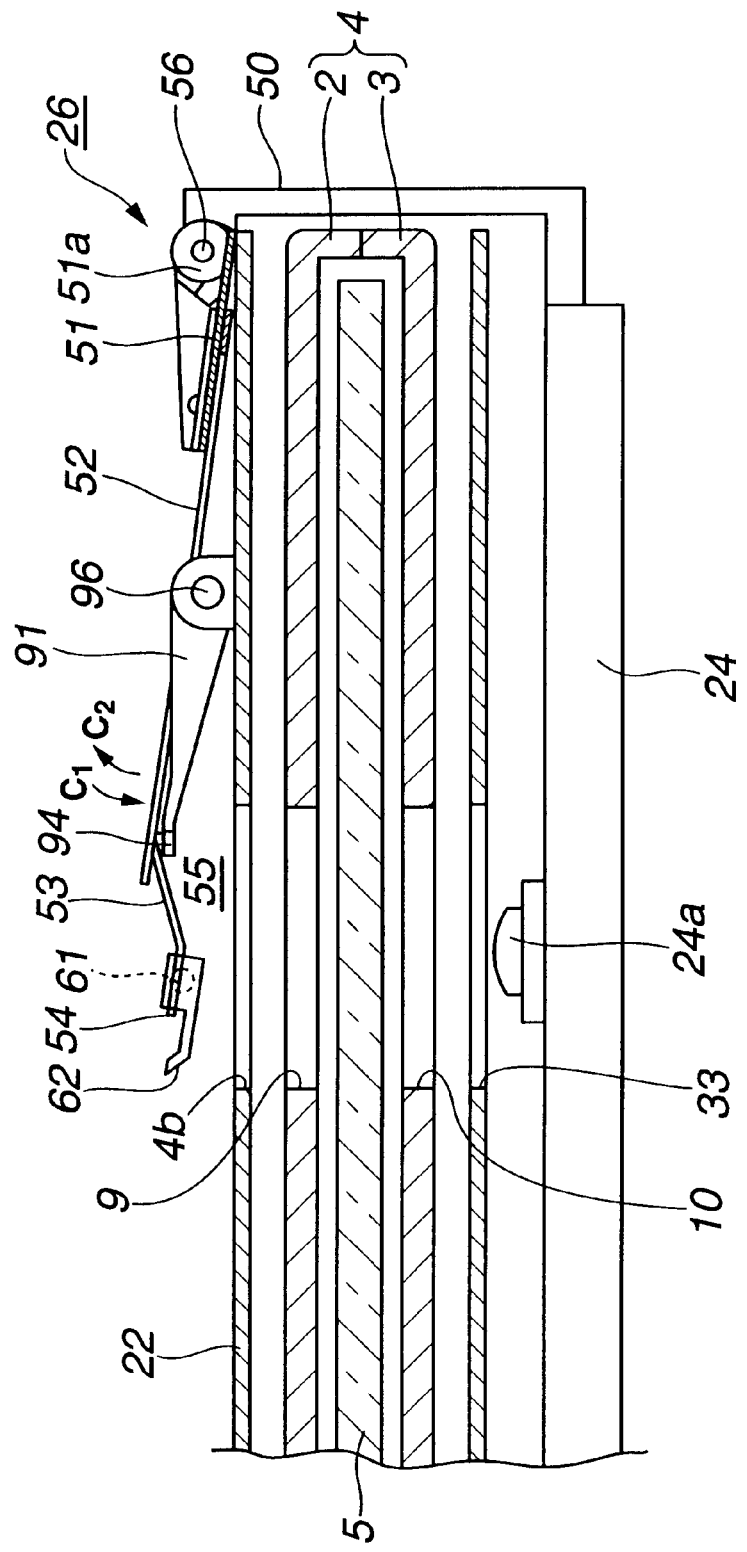
FIG. 3 is a sectional view of one part of the apparatus shown in FIG. 2, showing a disk cartridge held in the cartridge holding section of the apparatus.

The magnetic head device 26 is provided to apply a magnetic field to the recording layer of the magneto-optical disk 5. As shown in FIGS. 2 and 3, the magnetic head device 26 is coupled to the optical pickup device 24 by a coupling member 50 shaped almost like L. The device 26 can therefore move along with the optical pickup device 24. The magnetic head device 26 comprises a support plate 51, a head support plate 53, a rotation control plate 52, and a head section 55. The support plate 51 is supported at its proximal end by the coupling member 50 secured to the optical pickup device 24 and can be rotated. The head support plate 53 has its proximal end supported by the distal end of the support plate 51. The control plate 52 is fastened to the support plate 51, overlapping the proximal part of the support plate 51. The head section 55 is designed to apply a magnetic field to the recording layer of the magneto-optical disk 5.

The magnetic head device 26 is supported at one end and can be rotated since the coupling member 50 is supported at its proximal end by the support plate 51. The coupling member 50 is secured at its lower part to a carriage, which is one of the components of the optical pickup device 24. The upper part of the coupling member 50 extends to the top of the cartridge holder 22 along the rear edge of the base 21. An axle 56 is provided at the upper end of the coupling member 50, which is a free end. The axle 56 supports the proximal end of the support plate 51 such that the support plate 51 can rotate around the axle 56.

The support plate 51, which supports the magnetic head device 26 to the distal end of the coupling member 50, allowing the head device 26 to rotate, is a metal plate. The support plate 51 is therefore rigid enough to hold the proximal end of the head device 26 firmly and reliably and to rotate in stable condition. The support plate 51 is biased to rotate toward the cartridge holding section 25 or in the direction of arrow $C_1$ shown in FIG. 3, by means of a torsion spring (not shown). The torsion spring stretches between a pair of support strips 51a and the coupling member 50.

Figure 4:
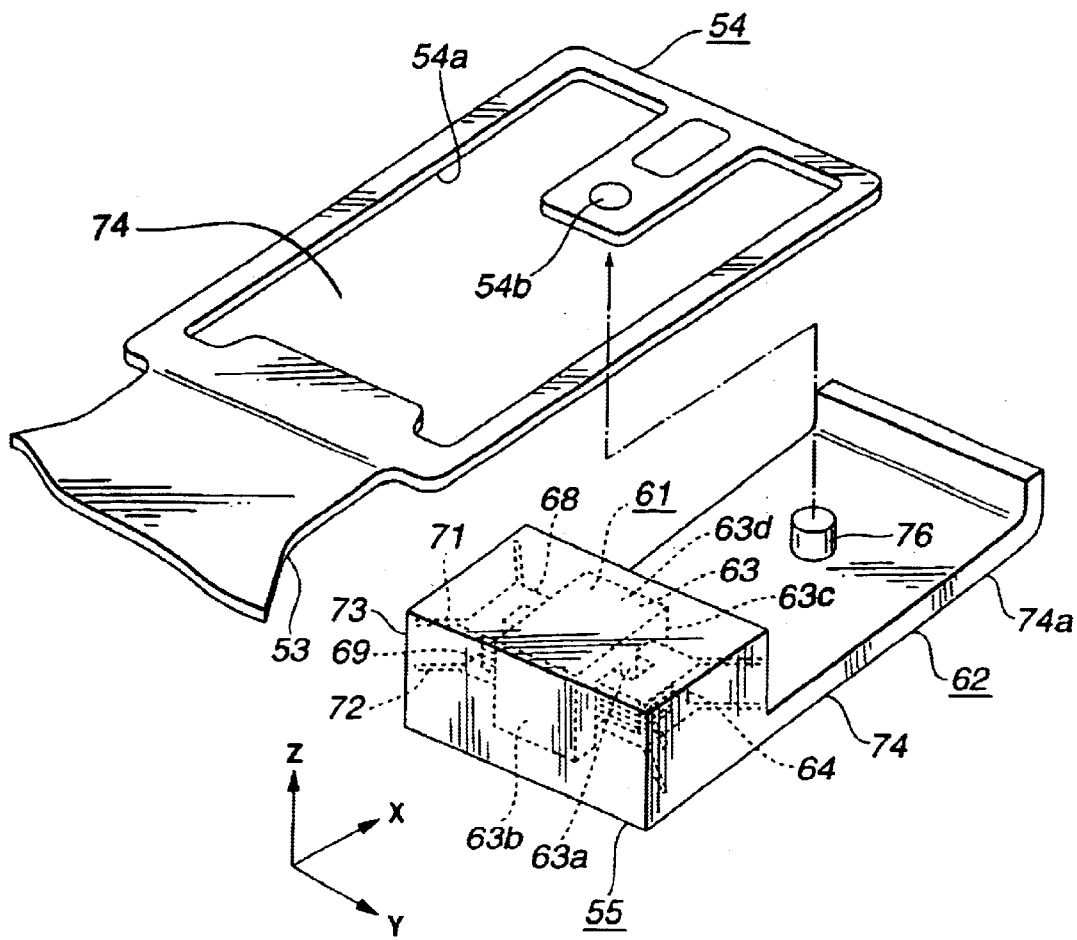
FIG. 4 is an exploded perspective view of a part of the apparatus, showing the distal portion of the head supporting plate of a magnetic head device and the head section of the device, which is secured to the distal portion of the head supporting plate.

The rotation control plate 52 has its proximal end secured to the distal end of the support plate 51. The rotation control plate 52 is made of an elastic metal plate. The plate 52 has a plurality of through holes in its proximal part. The plate 52 is positioned with respect to the support plate 51 and fastened thereto, by using screws extending through these holes or by fitting projections of the support plate 51 into these holes. The rotation control plate 52 extends from one side of the support plate 51. The distal end of the plate 52 controls the rotation of the head support plate 53 when the plate 53 is rotated away from the cartridge holding section 25, thereby preventing the plate 53 from being displaced to excess. The head support plate 53, which supports the head section 55 for applying a magnetic field to the recording layer of the magneto-optical disk 5, is an elastic, thin metal plate. The plate 53 has its proximal end secured to the support plate 51 and overlaps the support plate 51. The head support plate 53 holds, at its proximal part, the head section 55 that applies a magnetic field to the recording layer of the magneto-optical disk 5. The head support plate 53 applies a resilient force to the head section 55. The resilient force is barely strong enough to make the head section 55 lightly touch the surface of the magneto-optical disk 5 to record data signals on the disk 5. The head support plate 53 has a head-holding section 54, on which the head section 55 is provided. As shown in FIGS. 3 and 4, the head-holding section 54 has a head-holding opening 54a made by means of punching. The opening 54a is substantially rectangular. A tongue-shaped strip horizontally protrudes from the distal end of the head support plate 53 toward the proximal end thereof. This strip has an engagement hole 54b, into which an engagement projection of the head section 55 can be fitted. The head section 55 is positioned within the head-holding opening 54a.

Figure 5:
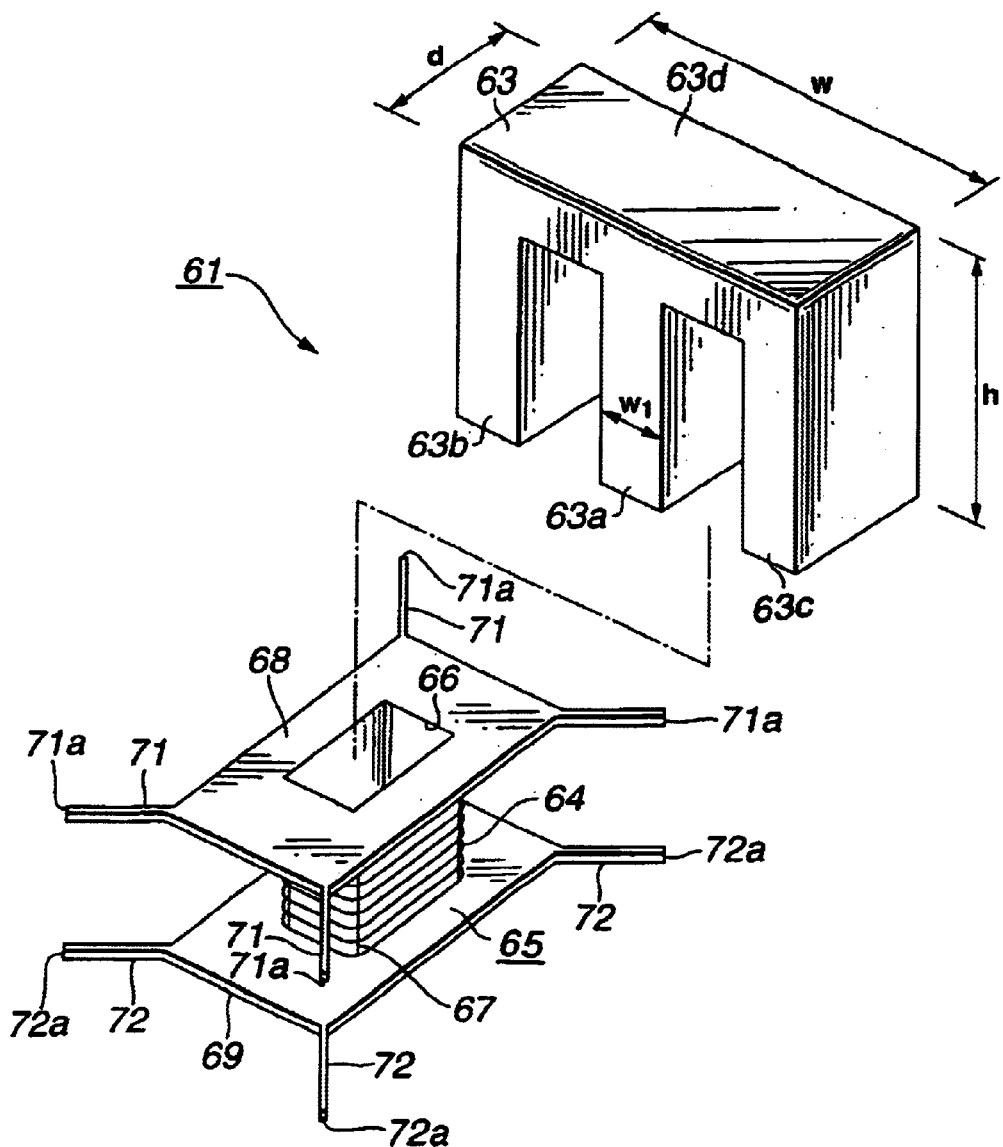
FIG. 5 is an exploded perspective view of the magnetic field generating section of the magnetic head device.

As shown in FIGS. 4 and 5, the head section 55 secured to the head-holding section 54 comprises a magnetic field generating section 61 and a slider 62. The section 61 generates a magnetic field to be applied to the recording layer of the magneto-optical disk 5. The slider 62 supports the magnetic field generating section 61 and can move in sliding contact with one major surface of the magneto-optical disk 5. Thus, the head section 55 can apply the magnetic field generated by the section 61, to the magneto-optical recording layer of the magneto-optical disk 5.

As FIG. 5 shows, the magnetic field generating section 61 comprises a magnetic core 63 and a coil 64 wound around the core 63. The magnetic core 63 is made of magnetic material such as Ni—Zn ferrite. The core 63 is composed of a center pole core 63a, a pair of side pole cores 63b and 63c, and a connecting part 63d. The side pole cores 63b and 63c are located respectively on one side of the center pole core 63a and the other side thereof. The connecting part 63d connects the pole cores 63a, 63b and 63c at one end. Thus, the magnetic core 63 is shaped like letter E as a whole. The center pole core 63a is longer than the side pole cores 63b and 63c. Its distal end projects a little from the plane in which the distal ends of the side pole cores 63b and 63c exist.

A bobbin 65 is loosely mounted on the center pole core 63a. The above-mentioned coil 64 is wound around the bobbin 65. The bobbin 65 is made of synthetic resin suitable for molding of very high precision, such as liquid crystal polymer or polyphenylene sulfide. The bobbin 65 comprises a coil holder 67 and a pair of flanges 68 and 69. The coil holder 67 has an axial through hole, into which the center pole core 63a of the magnetic core 63 is to be inserted. The upper flange 68 and the lower flange 69 are rectangular plates, fastened to the upper and lower ends of the coil holder 67, respectively. The flanges 68 and 69 prevent the coil 64 from moving upwards and downwards. The upper flange 68 supports an end portion (not shown) of the coil 64 so that the coil 64 may be electrically connected to the control section of the recording/reproducing apparatus 20. Positioning projections 71a protrude from the corners of the upper flange 68, extending along the diagonals of the flange 68. Similarly, positioning projections 72a protrude from the four corners of the lower flange 69, extending along the diagonals of the flange 69. The projections 71a and 72a abut on the inner sides of a mold for molding the magnetic field generating section 61 and the slider 62 together. Thus, they appropriately position the magnetic field generating section 61 in the cavity of the mold, in a horizontal plane parallel to the magneto-optical disk 5, that is, in the directions of arrows X and Y shown in FIG. 4. The coil 64 is wound around the coil holder 67, and the center pole core 63a of the magnetic core 63 is inserted into the axial through hole of the coil holder 67. The coil 64 is thereby mounted on the magnetic core 63, with the coil 64 wound around the center pole core 63a. The positioning projections 71 and 72 need not protrude from the corners of the flanges 68 and 69. Rather, they may protrude from any other parts of the flanges, so long as they reliably position the magnetic field generating section 61 in the mold, in both the direction of arrow X and the direction of arrow Y.

The magnetic field generating section 61 thus constructed is supported by the slider 62. The slider 62 has been formed by injection molding. It is made of nonmagnetic, electrically insulating and hard wearing material, such as cement or plastic (e.g., liquid crystal polymer for molding). The slider 62 comprises a main body 73 and a sliding section 74. It is in the proximal part of the slider main body 73 that the magnetic field generating section 61 is embedded. The sliding section 74 extends from the slider main body 73 and from the distal end of the magnetic head device 26 and can move in sliding contact with the magneto-optical disk 5. The slider 62 is shaped like letter L as a whole. Inserted in the slider main body 73 is the magnetic field generating section 61. The section 61 is narrower than the head-holding opening 54a punched in the head-holding section 54 that is the distal end of the bead support plate 53. In the corners of the slider main body 73, there rest the distal portions 71a and 72s of the positioning projections 71 and 72 provided on the magnetic field generating section 61.

The sliding section 74, which can move in sliding contact with the rotating magneto-optical disk 5, extends from the lower surface of the slider main body 73 to the distal end of the slider 62. The distal portion of the sliding section 74 is bent upwards in the form of an arc. The sliding section 74 therefore has a sliding surface 74a that is curved along a gentle arc. That is, the sliding surface 74a has such an elevation angle with respect to the major surface of the magneto-optical disk 5, that it can assume a smooth sliding contact with the major surface of the magneto-optical disk 5.

Figure 6:
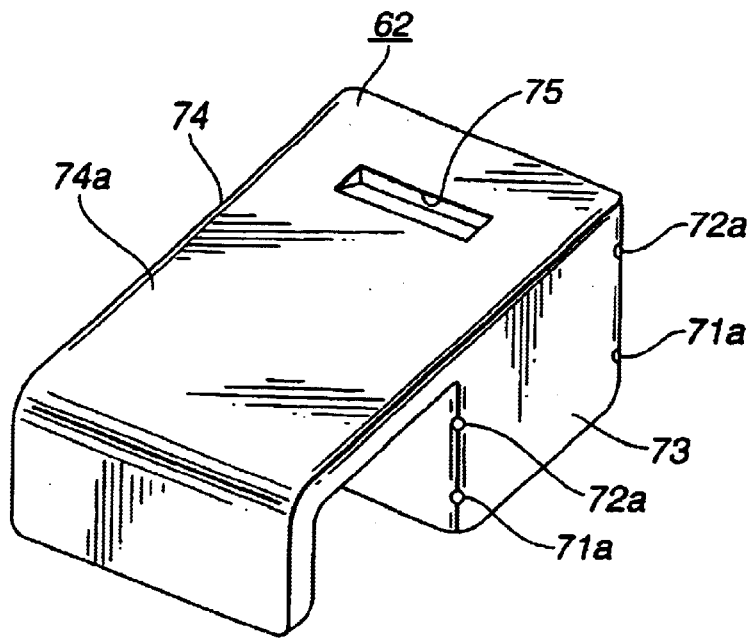
FIG. 6 is a perspective view of the head section, viewed from that surface of an magneto-optical disk with which the head section is set in sliding contact.

As shown in FIG. 6, the main body of the sliding section 74 has an recess 75, which is located to oppose the center pole core 63a of the magnetic core 63 embedded in the slider main body 73. The recess 75 comes to oppose the objective lens 24a of the optical pickup device 24 when data signals are recorded on the disk 5. The recess 75 is used to position the magnetic core 63 with respect to the objective lens 24a at the time of recording data signals. The recess 75 receives the positioning projections of the mold for injection-molding the slider 62, thereby to positioning the magnetic core 63 in the Z axis that extends at right angles to the magneto-optical disk 5. Further, the sliding section 74 has an engagement projection 76 in its upper surface. The engagement projection 76 protrudes from the upper surface of the sliding section 74. This projection 76 is fitted in the engagement hole 74b made in head-holding section 54, i.e., the distal part of the head support plate 53.

Figure 7:
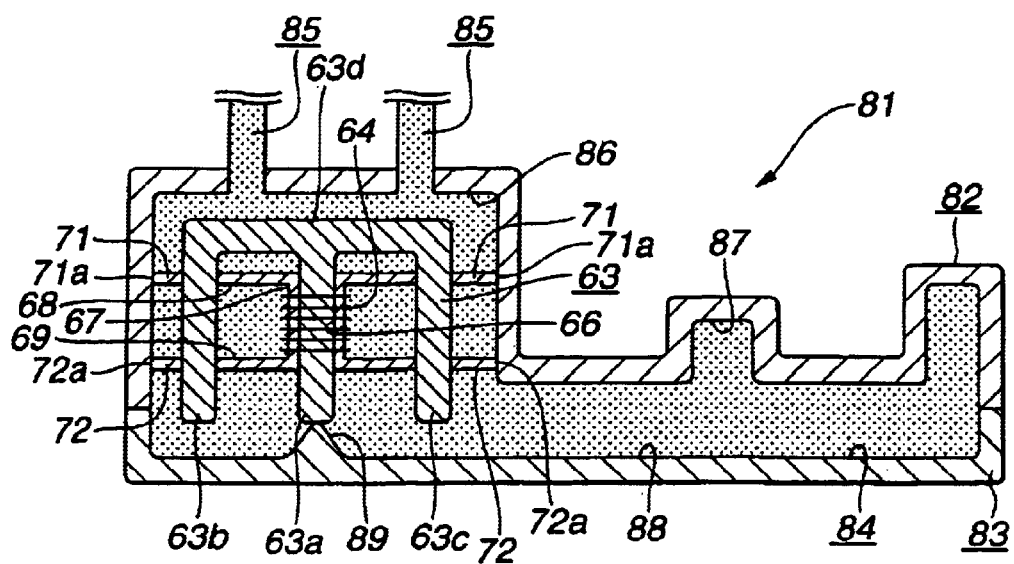
FIG. 7 is a sectional view of the metal mold for forming the head.

The head section 55, which has the magnetic field generating section 61 embedded in and formed integral with the slider 62, is formed by the use of such a metal mold 81 as is illustrated in FIG. 7. The metal mold 81 consists of a fixed mold half 82 and a movable mold half 83, which abut on each other and fastened together, forming a cavity 84. The fixed mold half 82 is designed to mold mainly the slider main body 73, while the movable mold half 83 to mold chiefly the sliding section 74.

The fixed mold half 82 has nozzles 85, through which material of the slider 62, such as plastic, cement or the like, is injected into the metal mold 81. The fixed mold half 82 has two sections 86 and 87 that define a part of the cavity 84. The first section 86 is designed to form the slider main body 73, whereas the second section 87 is designed to form the engagement projection 76 that protrudes from the sliding section 74. On the other hand, the movable mold half 83 has a section 88 defining the remaining part of the cavity 84 and designed to form the sliding section 74. The movable mold half 83 has a positioning projection 89 that abuts on the center pole core 63a of the magnetic core 63 to position the magnetic field generating section 61 in the cavity 84 before the cavity 84 is filled with the material of the slider 62.

To form the head section 55 by using the metal mold 81 described above, the movable mold half 83 is separated from the fixed mold half 82. In this condition, the magnetic field generating section 61 is placed in the fixed mold half 82. More precisely, the section 61 is positioned in the fixed mold half 82 such that the side pole core 63c of the magnetic core 63 is located at the nozzles 85 and the positioning projections 71 and 72 of the bobbin 65 are set in the corners of the first section 86 that is designed to form the slider main body 73. The magnetic field generating section 61 is thereby positioned in the cavity 84, in both the direction of arrow X and the direction of arrow Y.

The movable mold half 83 is then placed upon the fixed mold half 82. The mold halves 82 and 83 are fastened together, whereby the positioning projection 89 of the movable mold half 83 abuts on the center pole core 63a of the magnetic core 63. As a result, the magnetic field generating section 61 is positioned in the cavity 84. Thereafter, the material of the slider is injected into the cavity 84 through the nozzles 85. After the material solidifies, the movable mold half 83 is moved from the fixed mold half 82. The slider 62, which has the main body 73 embedding the magnetic field generating section 61, is taken out, whereby the head section 55 is made completely.

The head section 55 thus formed is secured to the head-holding section 54. More specifically, the engagement projection 76 of the sliding section 74 is fitted in the engagement hole 54b made in the head-holding section 54, and the slider main body 73 is fitted in the engagement hole 74b made in head-holding section 54. The projection 76 and slider main body 73 are fixed in position with adhesive such as epoxy resin. The head section 55 is connected to the control section of the recording/reproducing apparatus 20 by means of the wiring pattern provided on a flexible wiring board (not shown).

As indicated above, the head section 55 is formed integral with the slider 62 and has the magnetic field generating section 61 that is embedded in the slider 62. By contrast, the conventional head section 101 has the magnetic field generating section 105 that is fitted in the holder section 107 of the slider 106. The operating characteristic of the head section 55 will be explained, in comparison with that operating characteristic of the conventional head section 101. The magnetic field generating sections 61 and 105 are made of the same material and have the same size, and the sliders 62 and 106 are made of the same material and have the same size, for the purpose of comparing the head sections 55 and 101 in terms of temperature characteristic.

The design details of the magnetic field generating sections 61 and 105 will be described, with reference to FIG. 5. As mentioned above, the magnetic cores 63 and 105 are shaped like letter E. They have a width w of 3.1 mm, measured along a tangent to any track of the magneto-optical disk 5, a depth d of 0.5 mm, measured along a normal to any track of the disk 5, and a height h of 1.7 mm. The center pole core 63a of the magnetic corer 63 and the center pole core 102a of the magnetic core 102 have a width w, of 0.35 mm. The magnetic cores 63 and 102 are made of Ni—Zn ferrite. A wire having a diameter of 70 m is wound 30 times around the center pole core 63a, forming the coil 64. Similarly, a wire having a diameter of 70 m is wound 30 times around the center pole core 102a, forming the coil 103. The coils 64 and 103 have the same inductance L, which is 3.7 H at frequency 7 of 7 MHz. They have the same impedance Z of 11 Ω at frequency of 7 MHz. When a current of 190 mA flows through the coils 64 and 103, either coil generates a magnetic field whose intensity H is 150 Oe at a position which is 60 m above the center pole core (63a or 102a).

The sliders 62 and 106 having the magnetic field generating sections 61 and 105, respectively, are identical in shape and size, except for the holder section 107 of the slider 106. The sliders 62 and 106 have been formed by injection molding, by using plastic of liquid crystal polymer as material.

The head section 55 having the magnetic field generating section 61 embedded in the slider 62 will be compared with the head section 101 having the magnetic field generating section 105 embedded in the slider 106, in terms of temperature characteristic.

The head section 55 and the head section 101 were attached to two recording/reproducing apparatus of the same type, respectively. A current of 190 mA$_{0-P}$ based on a (1,7) RLL code was supplied to the head sections 55 and 101, with the channel bit clock signal set at a frequency of 18 MHz. The power lost in each of the coils 64 and 103 was about 0.3 W.

In the case of the conventional head section 101, the distal end of the center pole core 102a of the magnetic core 102 was at 140° C. when the ambient temperature was 25° C. In the head section 55, the distal end of the center pole core 63a of the magnetic core 63 was at 95° C. when the ambient temperature was 25° C.

The upper limit of the ambient temperature is 60° C. The temperatures of the distal ends of the center pole cores 63a and 102a are estimated to be 175° C. (=140+(60−25)) and 130° C.(=95+(60−25)), respectively, when the ambient temperature is at its upper limit (60° C.). If the temperatures of the distal ends of the magnetic cores 63 and 102 rise above 180° C., there will probably occur inter-layer short circuit or burning in the coils 64 and 103. In view of the temperature upper limit of 60° C. and the variation in the current/field efficiency, an allowance scarcely exists for temperature in the conventional head section 101. This is because the gap between the holder section 107 of the slider 106 and the magnetic field generating section 105 is about 0.1 mm and the slider 102 can hardly radiate heat. In the head section 55, heat can be efficiently radiated through the slider 62 since the magnetic field generating section 61 is embedded in the slider 62 and formed integral therewith.

That is, the head section 55 has magnetic field generating section 61 embedded in the slider 62 and formed integral with the slider 62. Hence, a gap is not formed between the section 61 and the slider 62 as in the conventional head section 101 in which a gap is provided between the magnetic field generating section 105 and the slider 106. This enhances the heat-radiating efficiency.

As described above, the head section 55 is made by injection molding, using the metal mold 81. Instead, the head section 55 may be formed by means of potting.

In the magnetic head device 26 described above, the support plate 51 can rotate, supported at one end by the distal part of the coupling member 50 as is illustrated in FIGS. 2 and 3. The head section 55 attached to the distal end of the head support pate 51 opposes the opening 46 of the cartridge holder 22. In the magnetic head device 26, the head section 55 attached to the distal part of the head support plate 53 is rotated around the axle 56 that is provided at the upper end of the coupling member 50, when driven by a lift mechanism 91 provided on the cartridge holder 22. The head section 55 can therefore move between a position close to the magneto-optical disk 5 contained in the cartridge 1 and a position remote from the disk 5.

As shown in FIG. 2, the lift mechanism 91 comprises a head lifting plate 92 and an operation plate 93. The head lifting plate 92 serves to rotate the head support plate 53 of the magnetic head device 26. The operation plate 93 is driven by a drive motor to rotate the head lifting plate 92. The plate 92 is provided on the upper surface of the cartridge holder 22 and extends over the opening 46 of the cartridge holder 22. The head lifting plate 92 is composed of a head supporting section 94 and two support arms 95 and 96. The section 94 supports the head support plate 53 from below. The support arms 95 and 96 protrude from the ends of the head supporting section 94, respectively. The head lifting plate 92 is supported at the proximal ends of the support arms 95, by means of axles 96 that are provided at the back of the cartridge holder 22 and in the vicinity of the opening 46. The head lifting plate 92 can rotate on the cartridge holder 22, around the axles 96.

The operation plate 93, which is provided to rotate the head lifting plate 92, is movably arranged on the cartridge holder 22. A cam 97 stands upright from one side of the operation plate 93. The cam 97 is set in engagement with a projection 98 protruding from the head lifting plate 92. The operation plate 93 is driven by a drive mechanism (not shown) provided below the base 21, sliding on the upper surface of the cartridge holder 22, in the direction of arrow $D_1$ (FIG. 2) when the disk cartridge 1 is inserted into the recording/reproducing apparatus 20 or in the direction of arrow $D_2$ (FIG. 2) when the cartridge 1 is removed from the apparatus 20. As shown in FIG. 3, the operation plate 93 rotates the head lifting plate 92 in the direction of arrow $C_1$ or in the direction of arrow $C_2$.

When the drive mechanism (not shown) provided below the base 21 drives the operation plate 93 in the direction of arrow $D_2$ (FIG. 2) on the upper surface of the cartridge holder 22, the cam 97 pushes the projection 98 upwards. As a result, the head lifting plate 92 is rotated in the direction of arrow $C_2$. Then, the support plate 51 supporting the head support plate 53 held by the head supporting section 94 is rotated in the direction of arrow $C_2$, against the bias of the torsion spring. When the operation plate 93 is moved by the drive mechanism in the direction of arrow $D_1$ (FIG. 2), the projection 98 moves downwards along the cam 97, causing the head support plate 53 to rotate in the direction of arrow $C_1$. The head support plate 53 is rotated by the bias 1of the torsion spring that is provided to rotate the head support pate 51.

The disk cartridge is inserted into the recording/reproducing apparatus 20, in which the cartridge is set in the cartridge holding section 25, as will be explained below. First, the cartridge holder 22 is rotated to the upper position above the cartridge holding section 25 as is illustrated in FIGS. 2 and 3, in order to record data signals on a magneto-optical disk 5 or reproduce data signals from the disk 5. In this condition, the cartridge slot 44 of the holder 22 is aligned with the slot made in one side of the apparatus 20. The disk cartridge 1 is inserted into the cartridge holder 22 via the slot 44 and held in the cartridge holding sections 42 and 43. At this time, the operation plate 93 of the lift mechanism 91 has already moved in the direction of arrow $D_2$ (FIG. 2) in the head section 55 of the magnetic head device 26. The cam 97 has pushed up the projection 98 protruding from the head lifting plate 92. The head lifting plate 92 has therefore been rotated in the direction of arrow $C_2$ (FIG. 3), spaced apart from the magneto-optical disk 5. This prevents the head section 55 from colliding with the main body 4 of the cartridge 1 when the disk cartridge 1 is inserted into the cartridge holder 22. The head section 55 is thereby protected. After the disk cartridge 1 is held in the cartridge holder 22, the cartridge holder 22 is rotated toward the cartridge holding section 25 and held in position in the cartridge holding section 25.

When the disk cartridge 1 is held in the cartridge holding section 25, it is detected that the cartridge 1 contains the magneto-optical disk 5 that is to be used as a recording medium. The record button is then pushed, selecting the recording mode. The operation plate 93 is thereby moved along the cam 97 in the direction of arrow $D_1$ (FIG. 2) as shown in FIGS. 2 and 3. So moved, the operation plate 93 rotates the head support plate 53 in the direction of arrow $C_1$ (FIG. 3). As the head support plate 53 is rotated in the direction of, the head section 55 attached to the distal part of the head support plate 53 moves from the position remote from the magneto-optical disk 5 to the position near close thereto. At the same time, the head section 55 moves into the cartridge holder 22 through the opening 46 of the cartridge holder 22.

The head section 55 enters the main body 4 of the cartridge 1 through the first recording/ reproducing window 9 until the sliding surface 74a of the sliding section 74 lightly touches the surface of the magneto-optical disk 5. When the disk drive mechanism 23 rotates the magneto-optical disk 5, an air film is generated between the disk 5 and the slider 62. Due to the air film the head section 55 floats above the surface of the disk 5, against the bias of the head support plate 53. The sliding surface 74a of the sliding section 74 is thereby set in slight contact with the surface of the magneto-optical disk 5.

The objective lens 24a of the optical pickup device 24 is located at the position where the sliding section 74 of the slider 62 remains in sliding contact with the magneto-optical disk 5. The light beam emitted from the optical pickup device 24 is applied to the magneto-optical disk 5. An external magnetic field, whose intensity has been modulated in accordance with a data signal, is applied to a part of the magneto-optical recording layer that has been irradiated with the light beam and lost coersive force. The data signal is thus recorded on the magneto-optical disk 5. The head section 55 that applies the external magnetic field to the magneto-optical recording layer of the disk 5 excels in heat-radiating property, because the magnetic field generating section 61 is embedded along with the main body 73 of the slider 62. The magnetic field generating section 61 can generate a magnetic field of a great intensity, without being damaged. This helps to increase the record/transfer speed.

No external magnetic field needs to be applied to the magneto-optical recording layer in order to read data signals recorded on the magneto-optical recording layer of the disk 5. Hence, the head section 55 is moved, remaining at a position away from the magneto-optical disk 5. That is, the head section 55 is spaced away from the magneto-optical disk 5 since the operation plate 93 of the lift mechanism 91 is moved in the direction of arrow $D_2$ (FIG. 2), causing the cam 97 to push up the projection 98 protruding from the head lifting plate 92, and the head lifting plate 92 is rotated in the direction of $C_2$ (FIG. 3). In this condition, the light beam emitted from the optical pickup device 24 scans the magneto-optical recording layer of the disk 5. The photo-electric detector provided in the optical pickup device 24 detects the light beam reflected from the layer of the disk 5. The data signals recorded on the magneto-optical disk 5 are thereby read out.

In the recording/reproducing apparatus 20 described above, the magnetic head device 26, which applies an external magnetic field to the magneto-optical disk 5 to record data signals thereon, has the head section 55. The head section 55, in turn, has magnetic field generating section 61 and the slider 62 that are formed integral with each other. Therefore, the head generated by the magnetic field generating section 61 can be radiated with high efficiency. For the same reason, the coil 64 of the magnetic field generating section 61 can be protected against damage. In addition, the magnetic field generated by section 61 can increase in intensity, thereby to enhance the record/transfer speed. Moreover, the magnetic field generating section 61 can be reliably positioned in the directions of arrows X and Y as shown in FIG. 7, because the positioning projections 71 and 72 of the bobbin 65 are set in the corners of the first section 86 of the metal mold 81. Furthermore, the movable mold half 83 is reliably positioned in the vertical direction, i.e., the direction of arrow Z (FIG. 4), because the positioning projection 89 of the movable mold half 83 abuts on the center pole core 63a of the magnetic core 63. The magnetic field generating section 61 can therefore be embedded at the prescribed position in the slider 62, without fail.

The magnetic head device.26 and the apparatus 20 using the device 26 and designed to record data signals on and read data signals from a magneto-optical disk 5, both according to the present invention, has been described with reference to the accompanying drawings. Nevertheless, the invention is not limited to the device 26 and the apparatus 20. Rather, the present invention may be applied to a magnetic head device that applies an external magnetic field to a magnetic disk to record data signals on and read data signals from the magnetic disk, and also to a magnetic recording/reproducing apparatus that uses this magnetic head device. The recording/reproducing apparatus 20 described above uses, as a recording medium, the disk cartridge 1 comprising the main body 4 and the magneto-optical disk 5 contained in the main body 4. Nonetheless, the present invention may be applied to a recording/reproducing apparatus that incorporates a bare disk used as a recording medium.

What is claimed is:

1. A magnetic head device comprising:
  a head section for applying a magnetic field to a disk, said head section including a magnetic field generating section and a slider supporting the magnetic field generating section and designed to be set in sliding contact with the disk, said magnetic field generating section having a magnetic field and embedded in and formed integral with the slider the magnetic field generating section being secured in the slider during formation of the slider about the magnetic field generating section.

2. A magnetic head device according to claim 1, wherein the slider is formed of plastic.

3. The magnetic device of claim 2 wherein the slider is formed by injection molding.

4. A magnetic head device according to claim 1, wherein a metal mold for forming the head section has a positioning projection to abut a distal end of the magnetic core, which opposes the disk, for positioning the magnetic field generating section in a direction substantially perpendicular to the disk.

5. A magnetic head device according to claim 1, wherein the coil is wound around a bobbin that is mounted on the magnetic core, and the bobbin has positioning projections to abut sides of a metal mold for forming the head section, thereby to position the magnetic field generating section in a direction substantially parallel to the disk.

6. A recording/reproducing apparatus comprising a magnetic head device which comprises:
  a disk driving mechanism for rotating a disk; and
  a magnetic head mechanism provided on a first side of the disk and comprising a head section for applying a magnetic field to a disk, said head section including a magnetic field generating section and a slider supporting the magnetic field generating section and designed to be set in sliding contact with the disk, said magnetic field generating section having a magnetic core and a coil wound around the magnetic core, designed to generate the magnetic field and embedded in and formed integral with the slider the magnetic field generating section being secured in the slider during formation of the slider about the magnetic field generating section.

7. A recording/reproducing apparatus according to claim 6, further comprising an optical pickup device provided on a second side of the disk and opposing the head section, for applying a light beam to the second side of the disk.

8. A magnetic head device according to claim 6, wherein the slider is formed of plastic.

9. The recording/reproducing apparatus of claim 8 wherein the slider is formed by injection molding.

* * * * *

UNITED STATES PATENT AND TRADEMARK OFFICE
CERTIFICATE OF CORRECTION

PATENT NO. : 6,741,526 B1
DATED : May 25, 2004
INVENTOR(S) : Kazuhiko Fujiie et al.

It is certified that error appears in the above-identified patent and that said Letters Patent is hereby corrected as shown below:

Column 4,
Lines 25 and 33, change "I" to -- 1 --;

Column 6,
Line 4, change "2 land" to -- 21 and --;

Column 10,
Line 28, change "w," to -- $w_1$ --;

Column 11,
Line 30, change "pate" to -- plate --;

Column 12,
Line 17, change "page" to -- plate --.

Signed and Sealed this

Fifth Day of October, 2004

JON W. DUDAS
*Director of the United States Patent and Trademark Office*